United States Patent [19]

Stark et al.

[11] 4,245,565
[45] Jan. 20, 1981

[54] CAMBERED HATCH COVER SEAL ARRANGEMENT

[75] Inventors: Marvin Stark, Houston, Tex.; Clement J. Kniola, Michigan City, Ind.

[73] Assignee: Pullman Incorporated, Chicago, Ill.

[21] Appl. No.: 882,022

[22] Filed: Feb. 28, 1978

[51] Int. Cl.³ .................. B61D 39/00; E04B 7/16; F16J 15/10
[52] U.S. Cl. .................. 105/377; 49/485; 52/19; 220/344; 277/165
[58] Field of Search ............ 277/165, 166; 49/485, 49/383; 114/203, 201; 105/377; 292/256.5; 52/19; 220/344

[56] References Cited

U.S. PATENT DOCUMENTS

| 3,126,591 | 3/1964 | Hamilton | 49/489 |
| 3,401,645 | 9/1968 | Floehr | 105/424 |
| 3,522,774 | 8/1970 | Beezhold | 105/377 |
| 3,763,595 | 10/1973 | Sudyk | 49/489 X |
| 3,796,168 | 3/1974 | Zeller | 105/377 |
| 3,913,927 | 10/1975 | Gordon | 277/166 |

Primary Examiner—Howard Beltran
Attorney, Agent, or Firm—Richard J. Myers; Stephen D. Geimer

[57] ABSTRACT

A trough hatch cover for a covered railway hopper car including an easily replaceable longitudinally convergently tapered elastomeric seal reactive therewith to form a weather-tight seal about the periphery of the hatch when secured by clamps at opposite ends of the hatch cover.

9 Claims, 4 Drawing Figures

U.S. Patent   Jan. 20, 1981   4,245,565
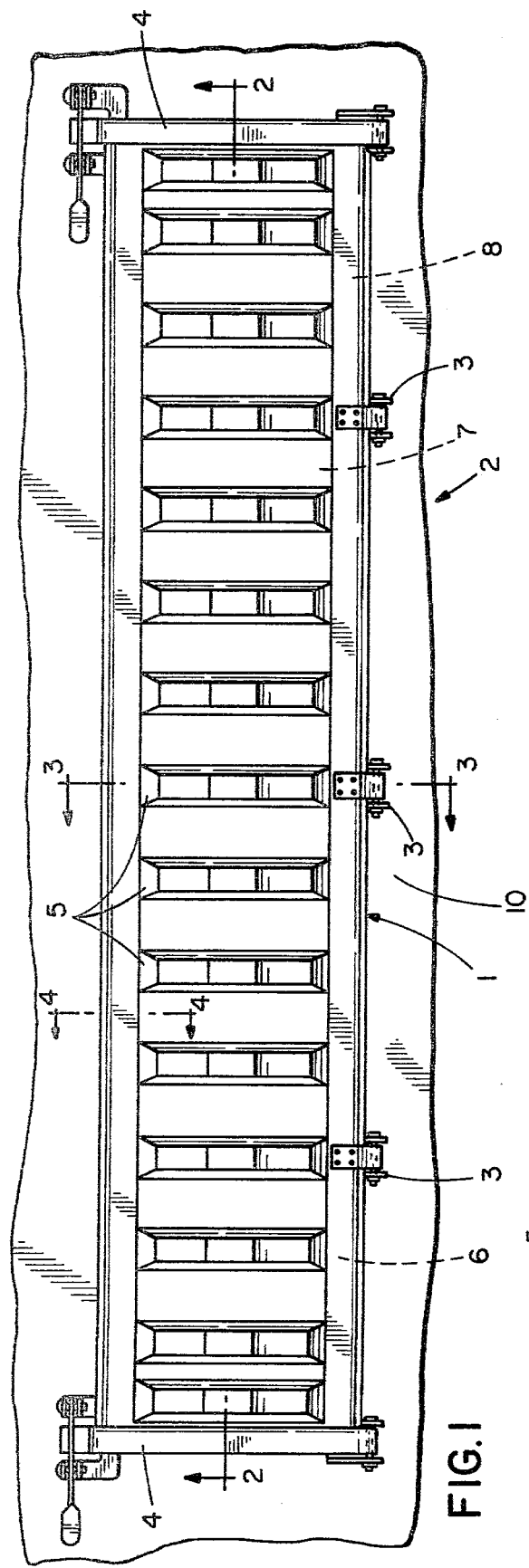
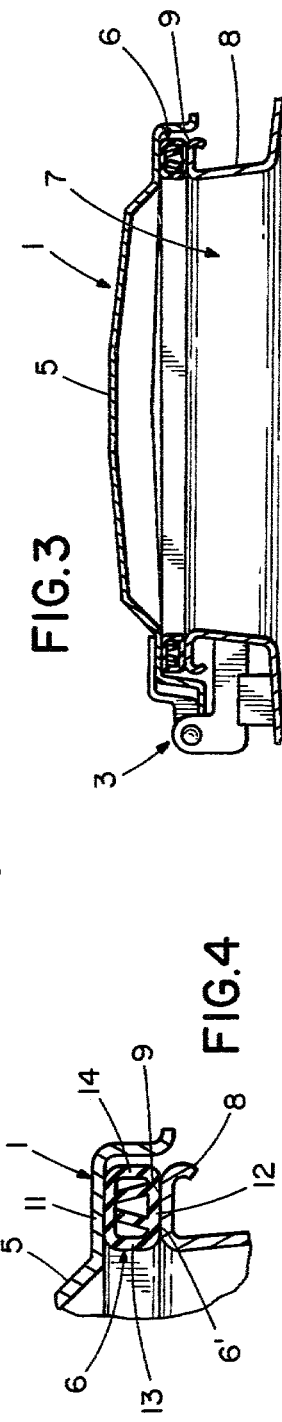
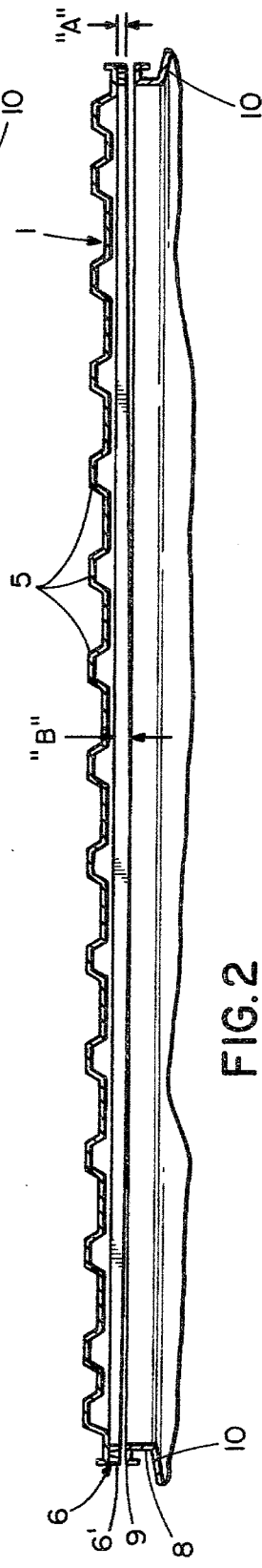

CAMBERED HATCH COVER SEAL ARRANGEMENT

BACKGROUND OF THE INVENTION

1. Field of the Invention

This invention relates to a trough hatch cover sealing arrangement for covered railway hopper cars or the like.

2. Description of the Prior Art

The prior art discloses a variety of trough hatch cover sealing arrangements, as in U.S. Pat. No. 3,796,168 which discloses a preshaped cambered hatch cover which effects sealing by predetermined distortion of its specially fabricated shape. This type of approach, however, is not readily adaptable to the hatch sealing arrangements of cars currently in use since it would necessarily require complete replacement or reconstruction of the existing hatch covers.

The novel hatch cover sealing arrangement of the present invention is an improvement over the prior art constructions and is readily adaptable for use with the multiplicity of existing hatch cover configurations.

SUMMARY OF THE INVENTION

The present invention provides for a hatch cover which includes a longitudinally convergently tapered elastomeric seal, reactive with the hatch cover and hatch coaming, of greater thickness at its central portions than at its end portions where the associated hatch cover is secured to the car. The convergently tapered or cambered elastomeric seal results in sealingly reactive stressing of the hatch cover when it is secured in the closed secured position such that the cover is resiliently biased against the hatch coaming, i.e., when the hatch cover is moved from its unstressed flat open condition to the slightly stressed, cambered closed configuration, it sealingly conforms to the convergently tapered contour of the elastomeric joint. The invention is further distinguished in that the use of only two hold down latches, one at each end of the cover, further assures and facilitates serviceability and convenience of use, and thus the integrity of the seal during field service.

BRIEF DESCRIPTION OF THE DRAWINGS

FIG. 1 is a fragmentary top elevational view of a typical hatch cover in place over the hatch opening of a transport vehicle or vessel;

FIG. 2 is a fragmentary longitudinal sectional view taken along lines 2—2 of FIG. 1 showing the hatch cover and cambered elastomeric seal of the present invention in the closed but unlocked position;

FIG. 3 is a fragmentary transverse sectional view on an enlarged scale taken along lines 3—3 of FIG. 1 showing a cross-sectional view of one of the reinforcing ribs of the hatch cover and its relative disposition to the cambered elastomeric seal; and FIG. 4 is an enlarged cross-sectional view of the seal taken substantially along lines 4—4 of FIG. 1.

DESCRIPTION OF THE PREFERRED EMBODIMENT

Referring of FIG. 1, a trough hatch cover 1, having a cross-section of generally channel shape defined by a base wall and depending side walls, is shown in place over a hatch opening 7 in the roof 10 of a covered railway hopper car 2 and associated hatch coaming 8.

The hatch cover 1 is provided with hinges 3 along the longitudinal edge so that it may be closed or open relative to hatch opening 7. Hatch cover hold down latching mechanisms 4 are mounted at opposite ends of hatch cover 1 in such a way as to positively engage the upper surface of hatch cover 1 and secure it in the closed position when hatch cover hold down latches 4 are secured. U.S. Pat. No. 3,522,774 discloses a suitable latching arrangement. A deformable, elastomeric seal or weather strip 6 is affixed to the lower surface of hatch cover 1 so as to be brought into a mating relationship with the coaming 8 about the periphery of hatch opening 7 when hatch cover 1 is in the hatch sealing or closed, locked position. The preferred embodiment includes transverse molded reinforcing ribs 5 longitudinally spaced along hatch cover 1. Although resiliency of the hatch cover 1 is required for proper functioning of the invention, means other than molded reinforcement ribs are clearly contemplated.

Referring to FIG. 2, a cross-sectional view of the cooperative hatch cover 1 and elastomeric seal 6 are shown. The trapezoidal cross-section of reinforcing ribs 5 can be seen in this figure. Coaming 8 includes a generally planar lip or mating peripheral surface 9 against which elastomeric seal 6 makes contact and is stressed when the hatch cover 1 is closed. The longitudinally convergingly cambered or tapered shape of the elastomeric seal 6 is illustrated by the difference in dimensions of portion "A" and portion "B" shown in FIG. 2. The elastomeric seal 6 is symmetrical about both its longitudinal and transverse axes and thus assuring essentially symmetric sealing load distribution about its periphery. In the preferred embodiment, the seal thickness at portion "B" is approximately one and one half times greater than the thickness at portion "A". Hatch cover 1 having a generally planar annular mating area when unflexed, thus provides that in the closed but unlocked position as indicated in FIG. 2, a gap exists between mating peripheral surface 9 of coaming 8 and elastomeric seal 6 which increases at points increasingly distant from portion "B".

The elastomeric seal is preferably a hollow, tubular member having top walls 11, bottom walls 12, inner walls 13, and outer walls 14, all of substantially the same thickness. The material may be sponge rubber or sponge polyurethane, or any other similar synthetic material such as, for example, neoprene.

Referring to FIG. 3, the relative disposition of hatch cover 1 and elastomeric seal 6 is shown with respect to hatch opening 7 and coaming 8 in the railway car 2 as seen along lines 3—3 of FIG. 1. Hatch cover 1 is operatively connected with railway car 2 by means of longitudinally spaced hinges 3, which allow hatch cover 1 to pivot about an axis adjacent one longitudinal edge of the hatch and thereby open and close relative to hatch opening 7. The mating peripheral surface 9 of hatch opening 7 and coaming 8 is of sufficient dimension to provide a positive seating surface for elastomeric seal 6 when hatch cover 1 is in the closed and locked position. As best shown in FIG. 4, the seal 6 also has intermediate upwardly converging walls 15 and 16 joined at their upper and lower edges to the top and bottom walls.

THE OPERATION

During the loading of bulk into the transport vehicle, the hatch cover 1 is in the open position relative to hatch opening 7. When loading is complete, the hatch cover 1 is rotated downward about a longitudinal axis by means of longitudinal hinges 3, bringing the elastomeric seal or weather strip 6 into contact with mating peripheral surface 9. At that point, only the longitudinally central fusiform portions of the elastomeric seal 6 are in contact with mating peripheral surface 9 of coaming 8. The end portions of hatch cover 1 are now resiliently stressed and the thick center portions of the seal are compressed attendant to fulcrumming and deforming the cover about the thick center portion "B" bringing the entire lower periphery or surface 6' of elastomeric seal 6 into contact with the mating peripheral surface 9. Elastomeric seal 6 is deformed in proportion and attendant to the resilient stressing of the cover 1. As best shown in FIGS. 3 and 4, seal 6 is positioned such that its top walls 11 and bottom walls 12 are in contact with the cover 1 and the mating surface 9, respectively, while inner and outer walls 13 and 14 of seal 6 are free or unconfined to permit lateral deflection or flow of the seal 6 when it is deformed. Intermediate walls 15 and 16 help to control this lateral deflection.

The hatch cover hold down latch mechanisms 4 are positioned to engage the upper end surfaces of hatch cover 1 and are locked. The longitudinally convergently cambered or tapered shape of the elastomeric seal 6 provides a resilient stressing of the hatch cover 1 such that the central portion of hatch cover 1 is resiliently biased by the internal tensile stresses of the hatch cover against the hatch coaming 8 due to the deflection of hatch cover 1 from its flat generally planar condition to a slightly longitudinally cambered configuration as it conforms to the cambered contour of elastomeric seal 6.

What is claimed is:

1. For use with a hatch having a generally planar lip and a flexible hatch cover with a perimeter portion designed to cooperate with said lip along a seating area to close the hatch, and latching means capable of exerting positive latching force on said hatch cover, an improved sealing arrangement comprising:
   an internally reinforced elastomeric seal adapted to be interpositioned along the seating area between said lip and a perimeter portion of said hatch cover,
   said seal having upper and lower surfaces adapted to mate with said hatch cover perimeter portion and said lip, respectively, and the inner and outer external surfaces of said seal accommodating lateral flow of said seal,
   said seal being connected to one of said hatch cover perimeter portion and said lip and having a tapered thickness, the thickest portion of which is located between said latching means and the thickness of the seal progressively decreasing toward the latching means, and
   said seal being compressed into a weather-tight relationship with said hatch cover and said lip upon securing the latching means thereby obtaining deflection of said hatch cover and attendant proportional deflection and lateral flow of said seal, said hatch cover thereby substantially conforming with said seal.

2. The combination according to claim 1 and
said seal comprising a tubular member having supplementary internal webs therein.

3. The invention according to claim 2 and
said webs arranged in converging relationship.

4. The invention of claim 2, wherein the maximum thickness of the seal member is substantially greater than the thickness of the seal adjacent the corresponding latching means to effect improved compressive sealing.

5. The invention according to claim 1 and
said seal comprising top, bottom and side walls, and webs connected between the top and bottom walls and positioned between said side walls.

6. The invention according to claim 5 and
said webs arranged in converging relation.

7. A hatch sealing arrangement comprising:
   a hatch having a continuous lip including substantially coplanar longitudinal side portions and transverse end portions,
   a flexible hatch cover including a peripheral lower edge having substantially coplanar longitudinal side portions and transverse end portions adapted to cooperate along an annular seating area with respective portions of said lip,
   a deformable tubular elastomeric seal member positioned between said hatch cover and said lip and having spaced longitudinal and transverse portions coextensive with said annular seating area, the inner and outer surfaces of said seal member accommodating lateral deflection of said seal member, said seal member having means centered within it for controlling lateral deflection thereof,
   each of said longitudinal portions of said seal being tapered in thickness from an intermediate thick section and becoming progressively thinner toward respective end portions, and
   latching means disposed adjacent respective end portions of said cover for exerting closing forces on said cover effective to deflect said cover along the longitudinal axis thereof and to proportionally deflect said seal attendant thereto to substantially conform said cover to the contour of said tapered seal and thereby establish a weather-tight engagement of said seal across said annular seating area.

8. The invention of claim 7, wherein the maximum thickness of the seal member is substantially greater than the thickness of the seal adjacent the corresponding latching means to effect improved compressive sealing.

9. A sealing member particularly adapted for use between a flexible hatch cover and an associated hatch coaming comprising:
   a tubular elastomeric structure including top, bottom, and interconnecting side walls arranged in a box section,
   a pair of converging reinforcing webs centered between said side walls and connecting with said top and bottom walls,
   said top and bottom walls having external seating surfaces,
   said side walls accommodating lateral deflection of said sealing member and said converging webs controlling lateral deflection thereof, and
   said sealing member being tapered and decreasing in thickness from its thicker portions intermediate of associated hatch cover latches to its narrower portions at said hatch cover latches whereby latching of said associated hatch cover latches resiliently deflects said flexible hatch cover, said sealing member being proportionally deflected attendent thereto to effect a weather-tight seal between said hatch cover and said hatch coaming.

* * * * *